United States Patent [19]

Gabrlik et al.

[11] Patent Number: 4,886,089
[45] Date of Patent: Dec. 12, 1989

[54] GAS VENTING VALVE FOR LIQUID TANK

[75] Inventors: Zdenek Gabrlik, Brier; John M. Morris, Auburn; Charles J. Green, Vashon, all of Wash.

[73] Assignee: GT Development Corporation, Tukwila, Wash.

[21] Appl. No.: 200,006

[22] Filed: May 27, 1988

[51] Int. Cl.⁴ .............................................. F16K 17/36
[52] U.S. Cl. ...................................... 137/202; 220/202
[58] Field of Search ................ 137/202; 220/202, 203, 220/209, DIG. 33

[56] References Cited

U.S. PATENT DOCUMENTS

| 2,990,842 | 7/1961 | Good | 137/202 |
|---|---|---|---|
| 3,306,314 | 2/1967 | Judsen | 137/202 |
| 3,757,987 | 9/1973 | Marshall | 137/43 |
| 3,970,098 | 7/1976 | Boswank et al. | 137/39 |
| 4,168,705 | 9/1979 | Raab | 128/66 |
| 4,325,398 | 4/1982 | Green | 137/39 |
| 4,390,107 | 6/1983 | Hukuta | 220/202 |
| 4,457,325 | 7/1984 | Green | 137/39 |
| 4,487,215 | 12/1984 | Green | 137/43 |
| 4,579,135 | 4/1986 | Sakata et al. | 137/39 |
| 4,666,058 | 5/1987 | Harris | 220/DIG. 33 X |
| 4,770,201 | 9/1988 | Zakai | 137/202 |
| 4,781,218 | 11/1988 | Mori et al. | 137/202 |

FOREIGN PATENT DOCUMENTS 853806  3/1940  France .

Primary Examiner—John Fox
Attorney, Agent, or Firm—Joan H. Pauly; Delbert J. Barnard

[57] ABSTRACT

A venting valve (2) for a liquid tank, such as a vehicle fuel tank, has a float (64) confined in a cage (10). A valve element (86) is mounted on a mounting post (76, 78) carried by the top surface (72) of the float (64). The element (86) is pivotable about a horizontal axis (X). A rising liquid level in the cage (10) causes the float (64) to move upwardly and seat the valve element (86) against a valve seat (42). When the liquid level falls and the float (64) descends, the valve element (86) pivots on the mounting post (76, 78) and thereby acts as a lever to increase the effective weight of the float (64). This enables the lightweight float (64) to overcome vapor pressure in the tank and unseat the valve element (86). The valve of the invention may be incorporated into a cap (102) for closing a vehicle fuel tank filling and venting tube.

27 Claims, 5 Drawing Sheets

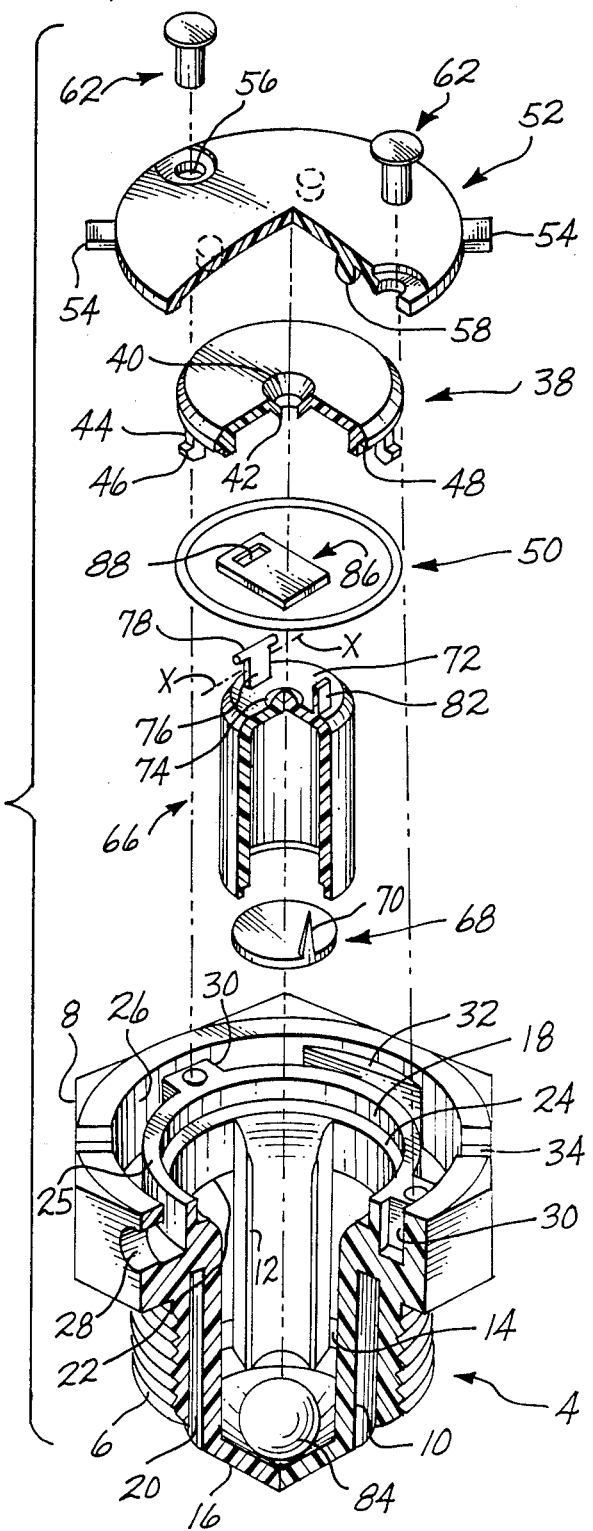

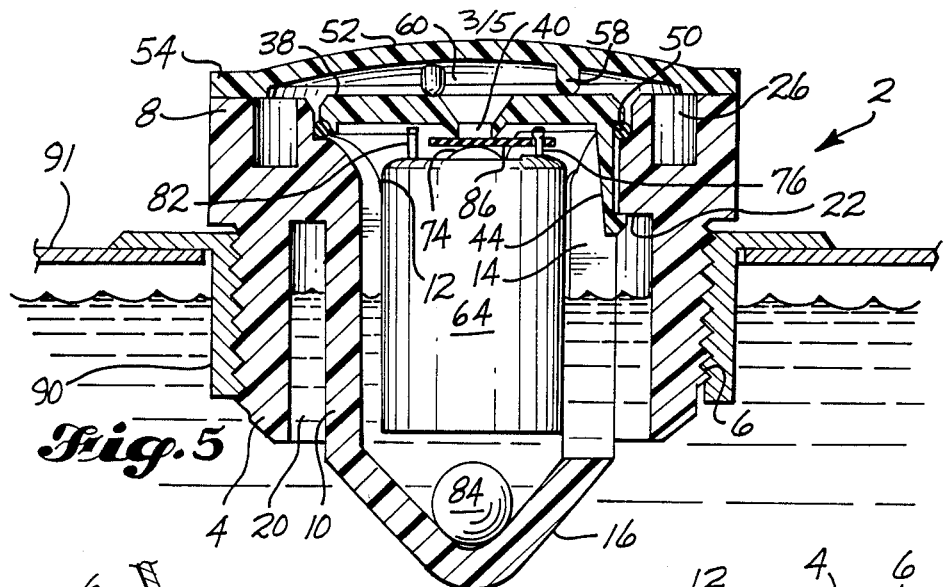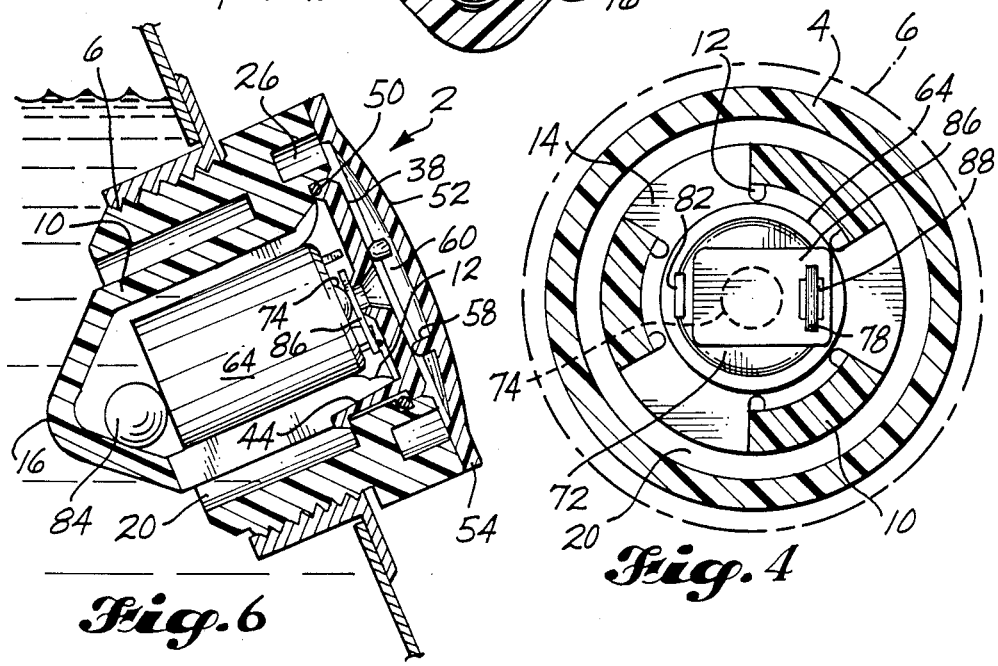

GAS VENTING VALVE FOR LIQUID TANK

DESCRIPTION

1. Technical Field

This invention relates to gas venting valves for liquid tanks and, more particularly, to such a valve in which a valve element carried by a float closes the valve to prevent liquid from exiting the valve housing, and in which the valve element is pivotably mounted to act as a lever to overcome vapor pressure in the housing and unseat when the liquid level falls.

2. Background Art

Fuel reservoirs on vehicles are commonly provided with venting valves to vent vapor pressure and prevent buildup of pressure in the reservoir. Such valves are commonly provided with a closure to prevent egress of liquid from the reservoir when the liquid sloshes in the reservoir and when the vehicle is overturned. One method of closing vehicle venting valves is to provide a float and a weighted member in the valve. The float rises with a rising liquid level, such as when the liquid sloshes, to close the valve. The weighted member is positioned below the float to move the float into a closed position when the vehicle is in an overturned condition. Because of weight and space limitations, the size of this type of venting valve is preferably kept at a minimum. In a small valve, the venting orifice is relatively large compared to the size of the valve and the float. This has led to a problem in ensuring that the valve reliably performs both its vapor venting and its liquid containment functions. It is difficult to design a float which is heavy enough to unseat reliably yet light enough to seat securely when the liquid sloshes in the reservoir.

U.S. Pat. No. 2,990,842, granted July 4, 1961, to A. L. Good, discloses a valve for controlling the volume of air in a liquid-air system, such as a home water supply tank, which is highly sensitive to slight variations in the liquid level. The valve includes a generally cylindrical float positioned in a cylindrical valve chamber. The chamber is connected to the system by a conduit. The float rises in the chamber in response to a rising liquid level. The movement of the float is guided by a post which extends upwardly into a hole in the center of the float. A reduced diameter cylindrical stem projects upwardly from the upper surface of the float body. A valve element is carried by the float. The valve element is formed from a thin piece of metal and has three normally flat sections. The first section is parallel to the top surface of the float body and is mounted thereto by a screw which holds the first element in its operative position "without gripping the element appreciably". The third section is parallel to the first section and normally rests flat against the top of the stem. The second section extends upwardly and radially inwardly between the first and third sections. The valve element is maintained in alignment with the valve seat by means of two downwardly extending ears which project from the first element into slots formed in the float body. When the liquid level drops, the float descends and pulls the valve element downwardly. All three sections of the element distort and bend, especially the third section. The bending of the third section is described as being sufficient to break the seal between the third section and the valve seat. Good states that the flexibility of the valve element and the "play" between the element and the screw permit the third section of the element and the stem on the float to separate when the float initially descends. Good also states that a pressure differential between the pressure in the valve chamber and the ambient air has very little effect on the operation of the valve element.

U.S. Pat. No. 4,579,135, granted Apr. 1, 1986, to Y. Sakata et al., discloses a vent valve for an automobile fuel tank. The valve has a generally cylindrical float which closes the valve to prevent fuel egress from the tank during operation of the vehicle. The valve does not have any apparent means for preventing spillage in an overturned condition. A semispherical stopper formed on the top of the float fits into and closes the vent opening when the liquid level rises. A passageway extends through the float from the bottom of the float to a top surface radially outward of the stopper. When the liquid level falls, vapor flows through this passageway from the fuel tank to the upper portion of the valve chamber. This equalizes the pressure in such upper portion with the pressure in the fuel tank. Sakata et al. state that this assures that the float can descend by gravity even if the clearance between the sides of the float and the inner surface of the valve compartment is small enough to allow gasoline to remain in such clearance under the influence of surface tension.

U.S. Pat. No. 4,168,705, granted Sept. 25, 1979, to A. Raab, discloses a one-way flow check valve for a hydrotherapy unit. The valve prevents back flow of air and water into the air inlet. The valve includes a hollow cylindrical float with an open bottom and a sealing gasket on its top surface. Movement of the float in a tubular body is guided by a plurality of ribs that extend axially along and project radially inwardly from the inner surface of the body. Raab states that, when a blockage occurs with sufficient rapidity, the float may seat before any appreciable amount of water has back flowed, and that in such case, a pressure relief is necessary to unseat the float.

U.S. Pat. No. 3,970,098, granted July 20, 1976, to S. E. Boswank et al., discloses a fuel tank vent valve with a generally cylindrical float and a weighted ball for seating the float in an overturned condition. The top of the float has a semispherical valve surface formed thereon. The surface area of the valve surface is significantly less than the surface area of the upper end of the float to decrease the amount of force required to sealingly seat the valve surface.

Vehicle vent valves with a ball float and a ball weight for seating the float in an overturned condition are disclosed in U.S. Pat. No. 4,325,398, granted Apr. 20, 1982, to C. J. Green; No. 4,457,325, granted July 3, 1984, to the same inventor; and No. 4,487,215, granted Dec. 11, 1984, also to the same inventor, and in French Pat. No. 853,806, published Mar. 29, 1940.

Motor vehicle fuel tank caps are disclosed in U.S. Pat. No. 3,757,987, granted Sept. 11, 1973, to C. J. Marshall; and No. 4,390,107, granted June 28, 1983, to M. Hukuta. The caps are provided with vents which are closed by the cooperation of a weighted needle valve element and a weighted ball in an overturned condition. Hukuta discusses the possibility that the valve element may not readily unseat when there is high vapor pressure in the tank or the valve element is fitted tightly into the valve seat. As a solution to this problem, Hukuta describes an embodiment in which a C-shaped arm member fitted around the ball weight is connected to the valve element to forcibly return the body to its unseated position.

The above patents and the prior art that is discussed and/or cited therein should be studied for the purpose of putting the present invention into proper perspective relative to the prior art.

DISCLOSURE OF THE INVENTION

A subject of the invention is a gas venting valve for a liquid tank. According to an aspect of the invention, the valve comprises a valve housing defining a valve chamber with a vent opening, and a valve seat surrounding the chamber side of the opening. A float is positioned in the chamber and includes a mounting post. A valve element is carried by the float. The element is positioned to sealingly engage the valve seat when the float is moved toward the seat by a rising liquid level in the chamber, to prevent liquid from exiting the chamber through the opening. The valve element has a hole extending therethrough for pivotably mounting the valve element on the mounting post. The valve element, the hole, and the post are dimensioned to permit the valve element to pivot on the post about an axis that extends perpendicularly through the post, to cause the valve element to act like a lever and increase the effective weight of the float to overcome vapor pressure in the chamber and unseat the valve element when the liquid level falls.

A preferred feature of the invention is a substantially flat valve element in combination with a rounded protuberance on the float. The float has a generally flat top surface with a center portion spaced radially inwardly from the mounting post. The rounded protuberance is formed on this center portion. A center portion of the valve element rests against the protuberance when the valve element is fully seated or fully unseated. The major advantage of this preferred feature is that it allows the valve element to tilt with respect to the float when the valve element is seated. This in turn automatically compensates for misalignments between the float and the valve seat. Such automatic compensation for misalignment permits the valve to be made with wider tolerances and, thereby, helps reduce the cost of manufacturing the valve. The automatic compensation also, of course, increases the reliability of the operation of the valve. The preferred feature also has the advantage of helping to prevent the valve element from sticking to the top of the float.

In situations in which the liquid tank may be subject to overturning, it is desirable to include in the valve a means for seating the valve element in the overturned position. A preferred way of providing such seating means is to provide the valve housing with a lower sidewall opposite the valve seat that tapers axially and radially inwardly. A weighted ball is positioned between the tapered sidewall and the float, to roll along the sidewall and move the float to seat the valve element when the valve is in an overturned position. This seating means is preferably provided in combination with the feature of a flat valve element and a float with a rounded protuberance so that any tendency of the weighted ball to misalign the float is automatically compensated.

Another preferred feature of the invention is a valve housing with a plurality of axially extending ribs. The ribs project radially into the valve chamber to guide axial movement of the float. The ribs have a radial extent sufficient to prevent liquid surface tension from holding the float up when the liquid level in the chamber falls.

A preferred embodiment of the valve element is substantially flat and is made from a semirigid elastomeric material. This type of valve element provides good sealing contact with the valve seat. The element's rigidity causes the hinging, lever-like action described above to assist in the unseating of the valve element. The valve element also has some flexibility so that the lever action is assisted by a peeling of the valve element away from the valve seat.

In order to increase the ease of assembly of the valve, the valve housing preferably includes a main body portion, an orifice plate member, a cover member, foot means, and an outlet passageway. The main body portion has an open top for receiving the float during assembly of the valve. The orifice plate member has a peripheral portion that sealingly engages the body portion and closes the open top in the assembled valve, and a center portion through which the vent opening extends. The cover member is secured to the body portion. The foot means is carried by one of the orifice plate member and the cover member and contacts the other of these members to define a space between these members opposite the chamber. The outlet passageway communicates this space with the exterior of the housing.

The body portion of the housing preferably includes a downwardly facing radial shoulder formed on an inner sidewall of the chamber. The orifice plate member has a leg projecting generally perpendicularly thereform into the chamber. The leg terminates in a radial flange positioned to engage the shoulder to retain the orifice plate member in position relative to the body portion. The leg has sufficient flexibility to allow the flange to snap into engagement with the shoulder during assembly of the valve. This preferred arrangement allows the valve to be easily assembled. In addition, the engagement of the flange with the shoulder assists the foot means in retaining the orifice plate member in proper position relative to the body portion.

Another subject of the invention is a cap for closing a vehicle fuel tank filling and venting tube. According to an aspect of the invention, the cap comprises a cap body defining a valve chamber with an inlet opening communicating the chamber with an interior portion of the tube inward of the cap, and an outlet opening. A passageway communicates the outlet opening with the exterior of the cap body. A valve seat surrounds the chamber side of the outlet opening. A float is positioned in the chamber and includes a mounting post. A valve element is mounted on the float and functions as described above.

A preferred feature of the cap is a float with a top surface from which the mounting post and a stop post project. The mounting post and the stop post are positioned to contact the cap body on opposite sides of the valve seat when the cap is subjected to an impact force of a predetermined magnitude. This arrangement has the advantage of preventing the valve seat from damaging the valve element when the cap is subjected to an impact force.

The invention solves the problem of providing a highly reliable but small and lightweight gas venting valve for liquid tanks. In apparatus constructed according to the invention, the float is light enough to consistently and reliably seat securely when liquid sloshes in the tank, but heavy enough to reliably unseat when the liquid level falls. The hinging, lever-like arrangement of the valve element increases the effective weight of the float for the purpose of unseating the valve element. For example, the effective weight in the preferred embodiment is about five times the actual weight. Therefore, there is a corresponding multiplication of the force tending to unseat the valve element. When the valve element has some flexibility, the hinging action of the element also helps prevent binding of the float due to torque on the float caused by bending of the element. Valves constructed according to the invention also have the advantage of being relatively easy and inexpensive to manufacture and maintain. The invention is also very versatile. The unseating curve, flow versus pressure, can be readily tailored to meet the needs of a particular situation by adjusting the relative rigidity or flexibility of the valve element.

These and other advantages and features will become apparent from the detailed description of the best modes for carrying out the invention that follows.

BRIEF DESCRIPTION OF THE DRAWINGS

In the drawings, like element designations refer to like parts throughout, and:

FIG. 2 is an exploded pictorial view of the venting valve shown in FIG. 1.

FIG. 4 is a sectional view taken along the line 4—4 in FIG. 3.

FIG. 5 is like FIG. 3 except that it shows the float moved into a closed position by a rise in liquid level.

FIG. 6 is a sectional view of the valve shown in FIGS. 1-5 in an overturned position.

BEST MODES FOR CARRYING OUT THE INVENTION

Figure 1:
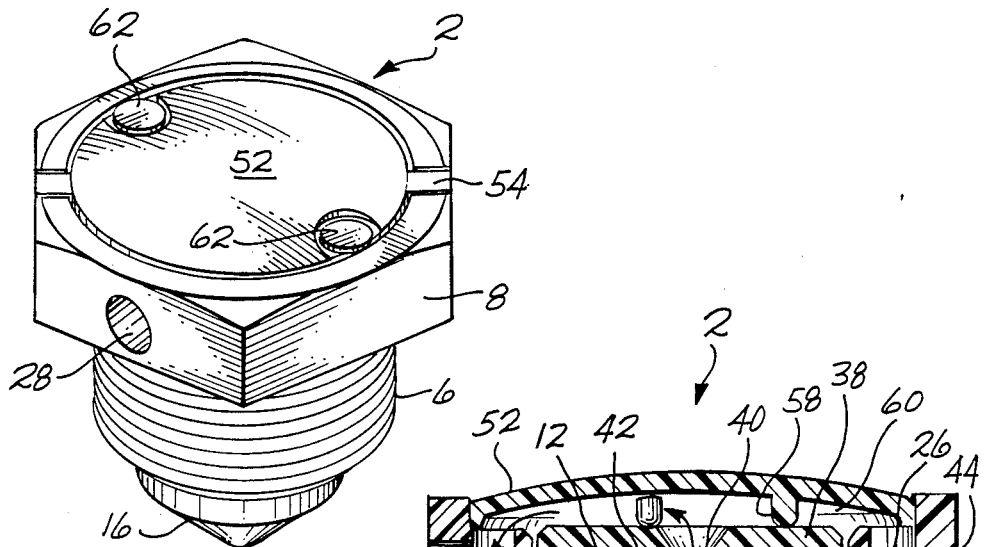
FIG. 1 is a pictorial view of a first preferred embodiment of the invention.

The drawings show a vent valve 2 and a fuel cap 102 that are constructed according to the invention and that also constitute the best modes for carrying out the invention currently known to the applicants. The vent valve 2 shown in FIGS. 1-6 is designed for use in the fuel tank of a motor vehicle. The cap 102 shown in FIG. 16 is designed for closing a vehicle fuel tank filling and venting tube. It is anticipated that the primary application of the invention will be in venting valves of the type shown in the drawings designed for use in motor vehicle fuel tanks. The valves may be provided either separately or incorporated into a filling and venting tube cap, as shown in FIG. 16. Although the anticipated primary uses of the invention are illustrated and described herein, it is intended to be understood that the invention may also be incorporated to advantage in other types of vehicle venting valves and in venting valves designed for use in environments other than motor vehicles.

The gas venting valve 2 shown in FIGS. 1-6 comprises a housing that includes a main body portion 4, an orifice plate 38, and a cover 52. The lower portion of the body 4 has external threads 6 formed thereon for securing the valve 2 to an internally threaded connector 90 positioned in the sidewall 91 of a fuel tank, as shown in FIGS. 5 and 6. A hexagonal head 8 is formed on the upper portion of the body 4 to facilitate installation of the valve 2 in the connector 90.

The body 4 forms a cage 10 which defines a valve chamber. In the assembled valve 2, a float 64 is positioned in the chamber. The cage 10 has an open top 18 for receiving the float 64 during assembly of the valve 2. In the assembled valve, the orifice plate 38 is positioned over the open top 18, as described below. The cage 10 is formed by a generally cylindrical sidewall and a lower axially and radially inwardly tapering, generally frustoconical end wall 16. A plurality of openings 14 extend radially through the cylindrical sidewall. The openings 14 extend axially along the length of the sidewalls. The cylindrical sidewall portion of the cage 10 is surrounded by an annular passageway 20. The passageway 20 opens onto the bottom of the body 4 to provide free communication between the interior of the tank and the interior of the cage 10 via the annular passageway 20 and the openings 14. Ribs 12 are formed on the solid portions of the cage sidewall to guide axial movement of the float 64. The ribs 12 extend axially along the sidewall and project radially therefrom into the valve chamber. The radial extent of the ribs 12 is sufficient to prevent liquid surface tension of the fuel from holding the float 64 up when the liquid level in the valve chamber falls. A weighted ball 84 is positioned in the bottom of the cage 10 between the float 64 and the frustoconical end wall 16.

The orifice plate 38 has a basic round flat shape. A vent opening 40 extends axially through a center portion of the plate 38. A valve seat 42 is formed on the lower surface of the plate 38 and surrounds the vent opening 40. A plurality of circumferentially spaced legs 44 extend perpendicularly downwardly from a peripheral portion of the lower surface of the plate 38. The outer periphery of the lower surface of the plate 38 forms an annular seal abutment 48.

Figure 3:
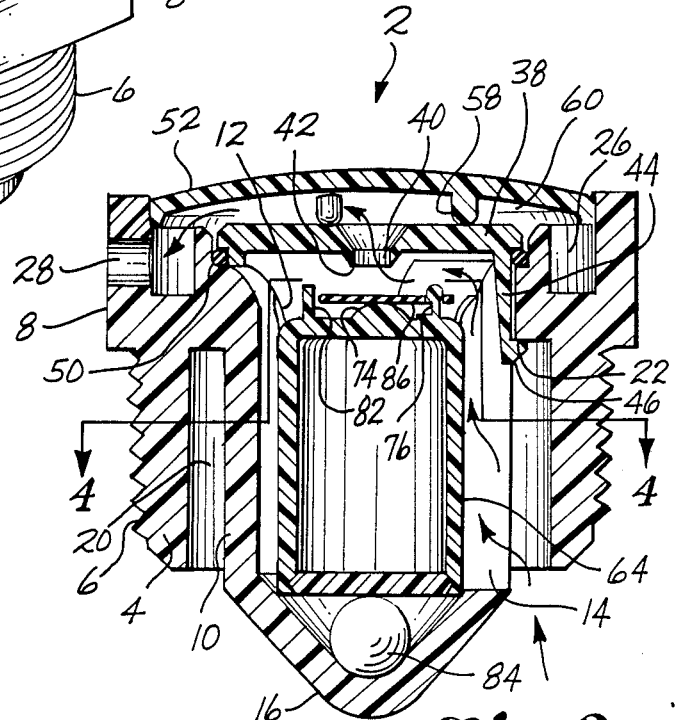
FIG. 3 is a sectional view showing the valve of FIGS. 1 and 2 with the float in a venting position.

As noted above, in the assembled valve 2, the orifice plate 38 covers the open top 18 of the valve chamber formed by the cage 10. The top of the chamber is closed by the orifice plate 38 except for the vent opening 40. An annular shoulder 24 is formed on the housing body 4. When the orifice plate 38 is in its assembled position relative to the cage 10, the shoulder 24 forms a sealing surface. An O-ring seal 50 is positioned between this sealing surface 24 and the annular sealing surface 48 on the orifice plate 38 to seal the interface between the orifice plate 38 and the body 4. The legs 44 on the orifice plate 38 extend downwardly into the valve chamber, as shown in FIGS. 3, 5, and 6. A flange 46 extends radially outwardly from the lower end of each leg 44. The flanges 46 engage a downwardly facing radial shoulder 22 formed by the valve body 4 on an inner sidewall of the cage 10. This engagement of the flanges 46 and the shoulder 22 helps to maintain the orifice plate 38 in its proper position relative to the valve body 4. The legs 44 have sufficient flexibility to allow the flanges 46 to snap into engagement with the shoulder 22 during assembly of the valve 2.

The valve body 4 forms an annular ridge 25 that surrounds and extends upwardly from the seal surface 24. An annular passageway 26 extends around the top portion of the body 4 between the ridge 25 and the outer portion of the head 8. An outlet 28 extends radially from the passageway 26 to an outside surface of the head 8. Referring to FIG. 2, the body has two fastener lugs 30, two chordal shoulders 32, and two indexing slots 34 for accommodating the cover 52.

The cover 52 is shaped like a slightly convex round disk. Two indexing tabs 54 extend radially from opposite portions of the periphery of the cover 52. Two fastener holes 56 extend through diametrically opposite portions of the cover 52. The holes 56 are positioned to align with the fastener lugs 30 on the valve body 4. When the cover 52 is placed on the body 4, the engagement of the tabs 54 in the slots 34 on the body 4 correctly position the holes 56 in alignment with the lugs 30. The cover 52 is secured to the body 4 by two fasteners 62. In the assembled valve 2, the cover 52 is flush with the top of the body 4.

A plurality of feet 58 extend downwardly and axially inwardly from the inner surface of the cover 52. The feet 58 engage the top surface of the orifice plate 38 to define a space 60 between the orifice plate 38 and the cover 52. The feet could alternatively be formed on the top surface of the orifice plate 38 and engage the inner surface of the cover 52. The space 60 is in communication with the vent opening 40 and with the outlet 28 via the passageway 26 to provide a continuous flow passageway for venting gas. The feet 58 maintain the orifice plate 38 in its proper position relative to the valve chamber and the valve body 4 to maintain proper functioning of the valve 2. The periphery of the inner surface of the cover 52 and the area around the fastener holes 56 in the cover 52 are thickened and rest on the fastener lugs 30 and the chordal shoulders 32 in the assembled valve 2. This limits the force exerted by the feet 58 on the orifice plate 38 and, thereby, prevents overcompression of the seal 50 when the cover 52 is secured to the body 4.

The float 64 is a generally cylindrical hollow enclosed member. To facilitate manufacture, the float 64 comprises a main body 66 having a top wall and a cylindrical sidewall, and a flat bottom 68. The bottom 68 snaps onto the main body 66 and is held in engagement therewith by a circular tongue and groove arrangement. A flexible finger 70 that extends perpendicularly upwardly from the top surface of the bottom 68 facilitates handling of the bottom 68 and provides a means for adjusting the weight of the float 64. The length of the finger 70 may be adjusted to adjust the weight of the float 64 to meet the requirements of a particular application without changing the basic configuration of the float 64.

The top surface 72 of the float 64 is flat with a rounded outer periphery. A rounded protuberance 74 is formed on the center portion of the top surface 72. A mounting post 76, 78 and a stop post 82 project perpendicularly upwardly from diametrically opposite portions of the flat top surface 72. The posts 76, 78, 82 are positioned near the outer edge of the flat portion of top surface 72 and are spaced radially outwardly from the rounded protuberance 74. The mounting post 76, 78 has a rectangular main portion 76 and terminates at its upper end in a head 78. The head 78 is wider in a chordal direction than the main portion 76.

A flat valve element 86 is pivotably mounted on the main portion 76 of the mounting post 76, 78. The head 78 retains the element 86 on the post 76, 78. The main portion of the post 76 is received through a rectangular hole 88 that extends through the valve element 86. The valve element 86, the hole 88, and the post portion 76 are dimensioned to permit the valve element 86 to pivot on the post portion 76 about a horizontal axis X (FIG. 2). The axis X extends through the post portion 76 in a chordal direction perpendicular to the vertical axis of the post portion 76.

The operation of the valve 2 is as follows. The normal venting position of the valve 2 is shown in FIG. 3. In this position, the valve 2 and the tank in which it is installed are in a normal upright position, and the liquid fuel level in the tank is below the entrance to the valve chamber defined by the lower opening to the annular passageway 20. The float 64 is resting on the lower frustoconical wall 16 and the weighted ball 84. The center portion of the valve element 86 is resting on the protuberance 74, and the attached end of the element 86 is adjacent to the post head 78. Vapor in the tank is freely vented through the valve 2. The vapor enters the valve 2 through the passageway 20, moves into the valve chamber through the axial openings 14 in the cage 10, flows up and around the float 64 and out of the valve chamber into the space 60 through the vent opening 40, and exits the valve 2 through the annular passageway 26 and the outlet 28.

FIG. 5 illustrates the functioning of the valve 2 when the fuel level in the tank rises or the fuel sloshes in the tank and enters the valve chamber. The rising of fuel level in the valve chamber causes the buoyant float 64 to move upwardly toward the orifice plate 38. The rising of the float 64 brings the valve element 86 into contact with the valve seat 42 to close the vent opening 40 and prevent liquid from exiting the valve chamber through the vent opening 40. When the valve element 86 is seated, its center portion contacts the protuberance 74 on the float 64, and the vertical axis of the protuberance 74 is within the seat 42. The weighted ball 84 remains in its position resting on the bottom of the frustoconical wall 16. When the liquid level in the tank falls or the sloshing subsides, the liquid level in the valve chamber falls below the lower opening to the annular passageway 20. This allows the float 64 to descend and the valve element 86 to unseat, as described below.

FIG. 6 illustrates the functioning of the valve 2 in an overturned condition. Such a condition would occur, for example, when the vehicle in which the tank and valve 2 are installed overturns. Movement of the valve 2 toward the position shown in FIG. 6 causes the weighted ball 84 to roll along the inner frustoconical surface of the end wall 16. The movement of the ball 84 moves the float 64 toward the orifice plate 38 to seat the valve element 86. This closes the vent opening 40 to prevent fuel from spilling out of the valve chamber and thereby prevent spilling of fuel out of the tank. When the overturned condition is corrected, the weighted ball 84 rolls back to its rest position shown in FIGS. 3 and 5 to allow the float 64 to descend and the valve element 86 to unseat.

When the liquid level in the valve chamber falls and/or the valve 2 is returned to its upright position, gravity causes the float 64 to descend toward its rest position shown in FIG. 3. The float 64 is small to accommodate the small size of the valve 2 and is lightweight to ensure proper seating of the valve element 86 when liquid sloshes in the tank. Because of the relatively small size and light weight of the float 64, the action of gravity may not be sufficient to unseat the valve element 86. Vapor pressure within the tank and the valve chamber tends to hold the valve element 86 in its seated position against the valve seat 42. The pivotal mounting of the valve element 86 on the float 64 assists gravity in overcoming vapor pressure to unseat the valve element 86.

Figure 7:
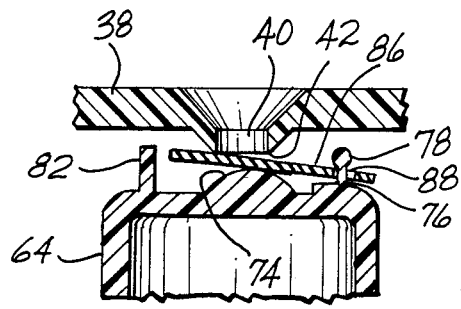
FIGS. 7-10 are fragmentary sectional views of a portion of the orifice plate and the float illustrating the unseating of the valve element.
Figure 8:
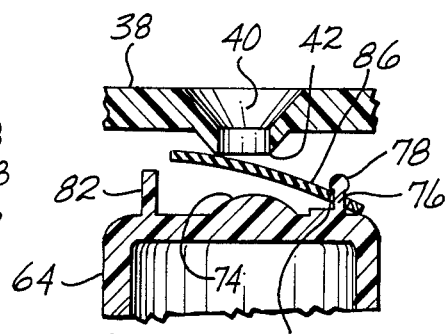

The unseating of the element 86 is illustrated in FIGS. 7–10. As the float 64 descends, the attached end of the valve element 86 pivots on the post portion 76 about the axis X. The pivoting of the valve element 86 allows it to act like a lever and increase the effective weight of the float 64 to overcome vapor pressure and unseat the valve element 86. In the preferred embodiment, the valve element 86 is made from a semirigid elastomeric material. Therefore, the element 86 flexes a small amount during the initial portion of the unseating sequence. FIG. 7 shows an initial very slight flexing, and FIG. 8 shows approximately the maximum flexing. The flexing of the valve element 86 provides a peeling action which assists the lever action of the valve element 86 to accomplish unseating.

The flexibility of the valve element could be varied without departing from the spirit and scope of the invention. A rigid valve element would not measurably bend. In such case, the increased effective weight of the float 64 would be obtained essentially exclusively by the lever action of the valve element. A valve element more flexible than the element 86 shown in FIGS. 7–10 would flex to a greater degree than the element 86. In that case, the relative significance of the peeling action and the lever action would be proportionally altered.

Figure 9:
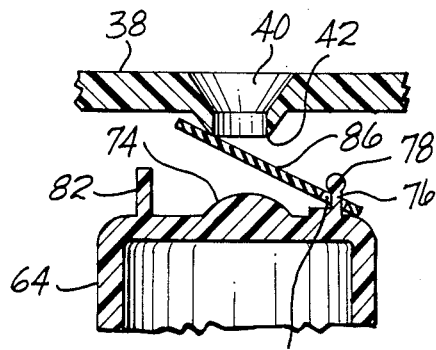
Figure 10:
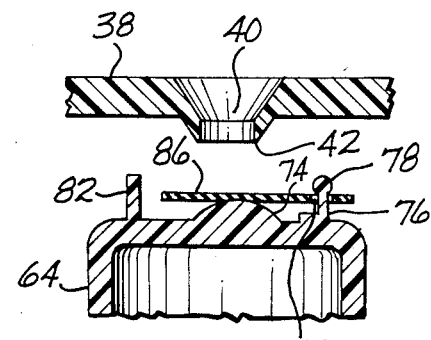
Figure 11:
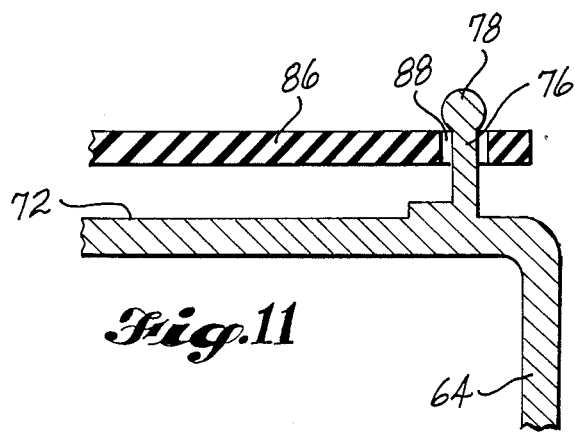
FIGS. 11 and 12 are enlarged fragmentary sectional views of portions of the valve element and the float illustrating the hinging movement of the valve element relative to the float.
Figure 12:
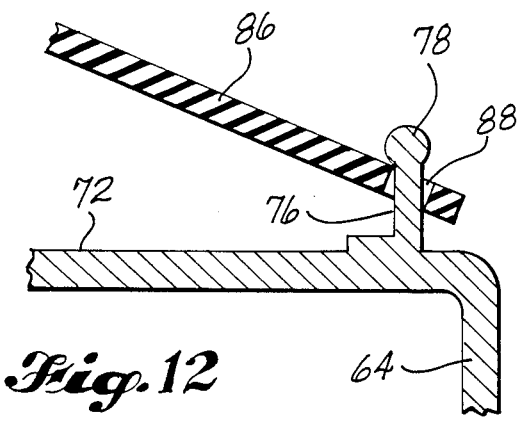

FIGS. 11 and 12 are enlarged fragmentary views illustrating the rest position of the valve element 86 shown in FIGS. 3 and 10 and a pivoted position of the valve element 86 (See FIGS. 7–9). As can be seen in FIG. 12, the dimensioning of the hole 88 in the valve element 86 and the relative thinness of the valve element 86 relative to the height of the post portion 76 allow the attached end of the valve element 86 to freely pivot on the post portion 76 without bending.

Figure 13:
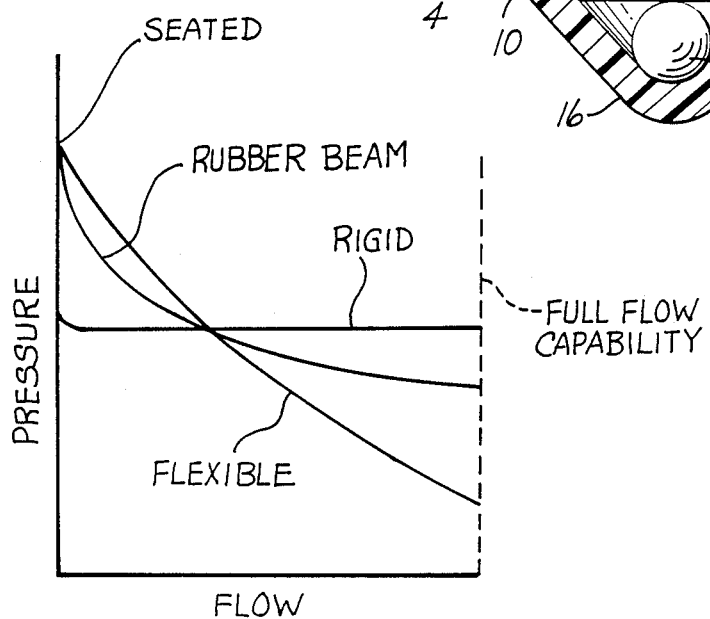
FIG. 13 is a graph of pressure versus flow illustrating the unseating curves for valve elements with three different degrees of rigidity.

As noted above, one of the advantages of the invention is that the unseating curve, pressure versus flow, can be tailored to meet various needs simply by adjusting the flexibility of the valve element. FIG. 13 is a graph showing the unseating curves for three valve elements with different flexibilities. The elements include a rigid element, a flexible element, and a semirigid rubber beam such as the preferred embodiment of the valve element 86 shown in FIGS. 7–10. The rigid element has the advantage of fully unseating, once unseating has begun, sooner than the more flexible element. The relative advantage of the more flexible elements is that they will commence unseating at a higher pressure. The rubber beam of the preferred embodiment balances these advantages to obtain relatively rapid full unseating while maintaining a capacity to commence unseating under a relatively high pressure.

Figure 14:
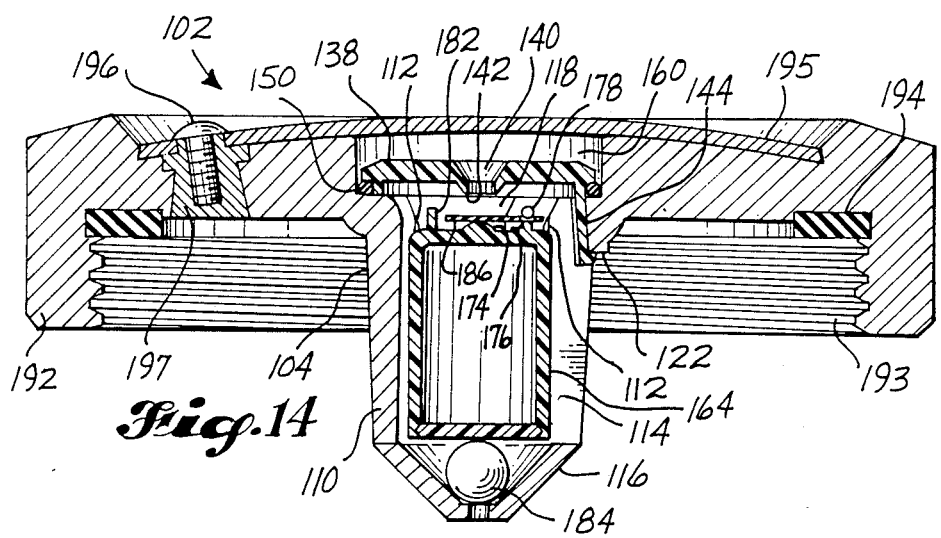
FIG. 14 is a sectional view of a second preferred embodiment of the invention.

FIG. 14 shows a second preferred embodiment of the invention which takes the form of a cap 102 for closing a vehicle fuel tank filling and venting tube. The cap 102 is of the same general type as that disclosed in Green, U.S. Pat. No. 4,457,325, cited above. The cap 102 has a body 192 with internal threads 193 for threadedly engaging the outer end of a fuel tank filling and venting tube. An annular gasket 194 is provided to sealingly engage the top end of the tube. A cover plate 195 is secured to the body 192 by a plurality of fasteners 196. Each fastener 196 engages a fusible insert 197 in the body 192 to allow the cover plate 195 to separate from the body 192 under high temperature conditions, as described in the patent. Other features of the cap 102 which are unrelated to the present invention have been simplified or omitted in FIG. 14.

A valve body 104 extends axially downwardly from the center portion of the cap body 192 into the filling and venting tube. The valve body 104 forms a cage 110. Like the cage 10 of the first embodiment, the cage 110 shown in FIG. 14 has a generally cylindrical sidewall with a plurality of ribs 112 and axially extending radial openings 114, and a lower frustoconical end wall 116. The sidewall and end wall 116 define a valve chamber with an open top 118.

The top 118 of the valve chamber is closed by an orifice plate 138. The plate 138 is essentially the same as the plate 38 of the first embodiment. A vent opening 140 extends through the center portion of the plate 138 and is surrounded on its lower side by a valve seat 142. A plurality of legs 144 extend perpendicularly inwardly from the inner surface of the plate 138 and engage a shoulder 122 formed on the valve body 104. A seal 150 is provided between the plate 138 and the valve body 104 to prevent leakage out of the valve chamber. A space 160 is formed above the orifice plate 138 between the plate 138 and the cover plate 195. The space 160 is in communication with the exterior of the cap body 192 by means of passageways (not shown), such as the passageways 40, 42 shown in the Green patent.

The second embodiment shown in FIG. 14 has a float 164, a weighted ball 184, and a valve element 186 which are substantially the same as the float 64, the ball 84, and the valve element 86 of the first embodiment. The float 164 has an upper rounded protuberance 174, a mounting post 176, 178, and a stop portion 182.

The venting valve portion of the cap 102 shown in FIG. 14 operates in the same manner as the venting valve 2, as described above. In both embodiments, the mounting post 76, 78, 176, 178 and the stop post 82, 182 are positioned to contact the lower surface of the orifice plate 38, 138 on opposite sides of the valve seat 42, 142 when the valve 2 or cap 102 is subjected to an impact force of a predetermined magnitude. This prevents the valve seat 42, 142 from damaging the valve element 86, 186. This feature is especially important when the valve of the invention is incorporated into a fuel cap, as shown in FIG. 14, since federal regulations require that fuel caps be able to withstand impact forces and to pass a drop test in which the cap is dropped upside down onto a hard surface. In each embodiment, the mounting post 76, 78, 176, 178 and the stop post 82, 182 are positioned so that they do not contact the orifice plate 38, 138 under normal operation of the valve. Contact occurs only when there is an impact force of a predetermined magnitude or when there is extrememly high pressure inside the tank. In both embodiments, the rounded protuberance 74 on the float 64 is dimensioned so that it also will not damage the valve element 86 when an impact occurs.

Although the preferred embodiments of the invention have been illustrated and described herein, it is intended to be understood by those skilled in the art that various modifications and omissions in form and detail may be made without departing from the spirit and scope of the invention as defined in the following claims.

What is claimed is:

1. A gas venting valve for a liquid tank, comprising:
a valve housing defining a valve chamber with a vent opening;
a valve seat surrounding said opening adjacent to the chamber;
a float positioned in the chamber and including a mounting post; and
a valve element carried by the float and positioned to sealingly engage the valve seat when the float is moved toward the seat by a rising liquid level in the chamber, to prevent liquid from exiting the chamber through said opening; said valve element having a hole extending therethrough for pivotably mounting the valve element on the mounting post; and said valve element, said hole, and said post being dimensioned to permit the valve element to pivot freely, without bending, on the post about an axis that extends perpendicularly through the post, to cause the valve element to act like a lever and increase the effective weight of the float to overcome vapor pressure in the chamber and unseat the valve element when said liquid level falls.

2. A valve as described in claim 1, in which the housing includes a plurality of axially extending ribs projecting radially into the valve chamber to guide axial movement of the float; said ribs having a radial extent sufficient to prevent liquid surface tension from holding the float up when the liquid level in the chamber falls.

3. A valve as described in claim 2, in which the valve element is substantially flat and is made from a semirigid elastomeric material.

4. A valve as described in claim 1, in which the valve element is substantially flat and is made from a semirigid elastomeric material.

5. A valve as described in claim 1, in which the valve housing includes a main body portion with an open top for receiving the float during assembly of the valve; an orifice plate member having a peripheral portion that sealingly engages said body portion and closes said open top in the assembled valve, and a center portion through which the vent opening extends; a cover member secured to said body portion; foot means carried by one of said members and contacting the other of said members to define a space between said members opposite the valve chamber; and an outlet passageway communicating said space with the exterior of the housing.

6. A gas venting valve for a liquid tank, comprising:
a valve housing defining a valve chamber with a vent opening;
a valve seat surrounding said opening adjacent to the chamber;
a float positioned in the chamber and including a mounting post; and
a valve element carried by the float and positioned to sealingly engage the valve seat when the float is moved toward the seat by a rising liquid level in the chamber, to prevent liquid from exiting the chamber through said opening; said valve element having a hole extending therethrough for pivotably mounting the valve element on the mounting post; and said valve element, said hole, and said post being dimensioned to permit the valve element to pivot on the post about an axis that extends perpendicularly through the post, to cause the valve element to act like a lever and increase the effective weight of the float to overcome vapor pressure in the chamber and unseat the valve element when said liquid level falls;
in which the valve element is substantially flat, and the float has a generally flat top surface with a center portion spaced radially inwardly from the mounting post and having a rounded protuberance formed thereon against which a center portion of the valve element rests when the valve element is fully seated or fully unseated.

7. A valve as described in claim 2, in which the valve housing includes a lower sidewall opposite the valve seat that tapers axially and radially inwardly; and which further comprises a weighted ball positioned between said sidewall and the float, to roll along said sidewall and move the float to seat the valve element when the valve is in an overturned position.

8. A valve as described in claim 6, in which the housing includes a plurality of axially extending ribs projecting radially into the valve chamber to guide axial movement of the float; said ribs having a radial extent sufficient to prevent liquid surface tension from holding the float up when the liquid level in the chamber falls.

9. A valve as described in claim 8, in which the valve element is made from a semirigid elastomeric material.

10. A valve as described in claim 6, in which the valve element is made from a semirigid elastomeric material.

11. A gas venting valve for a liquid tank, comprising:
a valve housing defining a valve chamber with a vent opening;
a valve seat surrounding said opening adjacent to the chamber;
a float positioned in the chamber and including a mounting post; and
a valve element carried by the float and positioned to sealingly engage the valve seat when the float is moved toward the seat by a rising liquid level in the chamber, to prevent liquid from exiting the chamber through said opening; said valve element having a hole extending therethrough for pivotably mounting the valve element on the mounting post; and said valve element, said hole, and said post being dimensioned to permit the valve element to pivot on the post about an axis that extends perpendicularly through the post, to cause the valve element to act like a lever and increase the effective weight of the float to overcome vapor pressure in the chamber and unseat the valve element when said liquid level falls;
in which the valve housing includes a main body portion with an open top for receiving the float during assembly of the valve; an orifice plate member having a peripheral portion that sealingly engages said body portion and closes said open top in the assembled valve, and a center portion through which the vent opening extends; a cover member secured to said body portion; foot means carried by one of said members and contacting the other of said members to define a space between said members opposite the valve chamber; and an outlet passageway communicating said space with the exterior of the housing; and
in which said body portion includes a downwardly facing radial shoulder formed on an inner sidewall of said chamber, and the orifice plate member has a leg projecting generally perpendicularly therefrom into said chamber and terminating in a radial flange positioned to engage said shoulder to retain the orifice plate member in position relative to said body portion, said leg having sufficient flexibility to allow said flange to snap into engagement with said shoulder during assembly of the valve.

12. A cap for closing a vehicle fuel tank filling and venting tube, comprising:
   a cap body defining a valve chamber with an inlet opening communicating the chamber with an interior portion of the tube inward of the cap, and an outlet opening;
   a passageway having an outer end extending through an exterior surface of said body, said passageway communicating said outer end with said outlet opening;
   a valve seat surrounding said outlet opening adjacent to the chamber;
   a float positioned in the chamber and including a mounting post; and
   a valve element carried by the float and positioned to sealingly engage the valve seat when the float is moved toward the seat by a rising liquid level in the chamber, to prevent liquid from exiting the chamber through said outlet opening; said valve element having a hole extending therethrough for pivotably mounting the valve element on the mounting post; and said valve element, said hole, and said post being dimensioned to permit the valve element to pivot freely, without bending, on the post about an axis that extends perpendicularly through the post, to cause the valve element to act like a lever and increase the effective weight of the float to overcome vapor pressure in the chamber and unseat the valve element when said liquid level falls.

13. A cap as described in claim 12, in which the cap body includes a plurality of axially extending ribs projecting radially into the valve chamber to guide axial movement of the float; said ribs having a radial extent sufficient to prevent liquid surface tension from holding the float up when the liquid level in the chamber falls.

14. A cap as described in claim 13, in which the valve element is substantially flat and is made from a semirigid elastomeric material.

15. A cap as described in claim 12, in which the valve element is substantially flat and is made from a semirigid elastomeric material.

16. A cap for closing a vehicle fuel tank filling and venting tube, comprising:
   a cap body defining a valve chamber with an inlet opening communicating the chamber with an interior portion of the tube inward of the cap, and an outlet opening;
   a passageway having an outer end extending through an exterior surface of said body, said passageway communicating said outer end with said outlet opening;
   a valve seat surrounding said outlet opening adjacent to the chamber;
   a float positioned in the chamber and including a mounting post; and
   a valve element carried by the float and positioned to sealingly engage the valve seat when the float is moved toward the seat by a rising liquid level in the chamber, to prevent liquid from exiting the chamber through said outlet opening; said valve element having a hole extending therethrough for pivotably mounting the valve element on the mounting post; and said valve element, said hole, and said post being dimensioned to permit the valve element to pivot on the post about an axis that extends perpendicularly through the post, to cause the valve element to act like a lever and increase the effective weight of the float to overcome vapor pressure in the chamber and unseat the valve element when said liquid level falls;
   in which the valve element is substantially flat, and the float has a generally flat top surface with a center portion spaced radially inwardly from the mounting post and having a rounded protuberance formed thereon against which a center portion of the valve element rests when the valve element is fully seated or fully unseated.

17. A cap as described in claim 16, in which the, cap body includes a lower sidewall that defines the bottom of the chamber opposite the valve seat and that tapers axially and radially inwardly; and which further comprises a weighted ball positioned in the chamber between said sidewall and the float, to roll along said sidewall and move the float to seat the valve element when the cap is in an overturned position.

18. A cap as described in claim 17, in which the valve element is made from a semirigid elastomeric material.

19. A cap as described in claim 18, in which the float has a stop post projecting from its top surface; said mounting post and said stop post being positioned to contact the cap body on opposite sides of the valve seat when the cap is subjected to an impact force of a predetermined magnitude, to prevent the valve seat from damaging the valve element.

20. A cap as described in claim 17, in which the float has a stop post projecting from its top surface; said mounting post and said stop post being positioned to contact the cap body on opposite sides of the valve seat when the cap is subjected to an impact force of a predetermined magnitude, to prevent the valve seat from damaging the valve element.

21. A cap as described in claim 16, in which the cap body includes a plurality of axially extending ribs projecting radially into the valve chamber to guide axial movement of the float; said ribs having a radial extent sufficient to prevent liquid surface tension from holding the float up when the liquid level in the chamber falls.

22. A cap as described in claim 21, in which the valve element is made from a semirigid elastomeric material.

23. A cap as described in claim 16, in which the valve element is made from a semirigid elastomeric material.

24. A cap as described in claim 23, in which the float has a stop post projecting from its top surface; said mounting post and said stop post being positioned to contact the cap body on opposite sides of the valve seat when the cap is subjected to an impact force of a predetermined magnitude, to prevent the valve seat from damaging the valve element.

25. A cap as described in claim 16, in which the float has a stop post projecting from its top surface; said mounting post and said stop post being positioned to contact the cap body on opposite sides of the valve seat when the cap is subjected to an impact force of a predetermined magnitude, to prevent the valve seat from damaging the valve element.

26. A cap for closing a vehicle fuel tank filling and venting tube, comprising:
   a cap body defining a valve chamber with an inlet opening communicating the chamber with an interior portion of the tube inward of the cap, and an outlet opening;
   a passageway having an outer end extending through an exterior surface of said body, said passageway communicating said outer end with said outlet opening;

a valve seat surrounding said outlet opening adjacent to the chamber;

a float positioned in the chamber and including a mounting post; and a valve element carried by the float and positioned to sealingly engage the valve seat when the float is moved toward the seat by a rising liquid level in the chamber, to prevent liquid from exiting the chamber through said outlet opening; said valve element having a hole extending therethrough for pivotably mounting the valve element on the mounting post; and said valve element, said hole, and said post being dimensioned to permit the valve element to pivot on the post about an axis that extends perpendicularly through the post, to cause the valve element to act like a lever and increase the effective weight of the float to overcome vapor pressure in the chamber and unseat the valve element when said liquid level falls;

in which the float has a top surface from which the mounting post and a stop post project; said mounting post and said stop post being positioned to contact the cap body on opposite sides of the valve seat when the cap is subjected to an impact force of a predetermined magnitude, to prevent the valve seat from damaging the valve element.

27. A cap as described in claim 26, in which the valve element is substantially flat and is made from a semirigid elastomeric material.

* * * * *